April 10, 1928.
G. S. WELLINGTON
AUTOMOBILE SIGNAL
Filed June 23, 1927
1,665,648
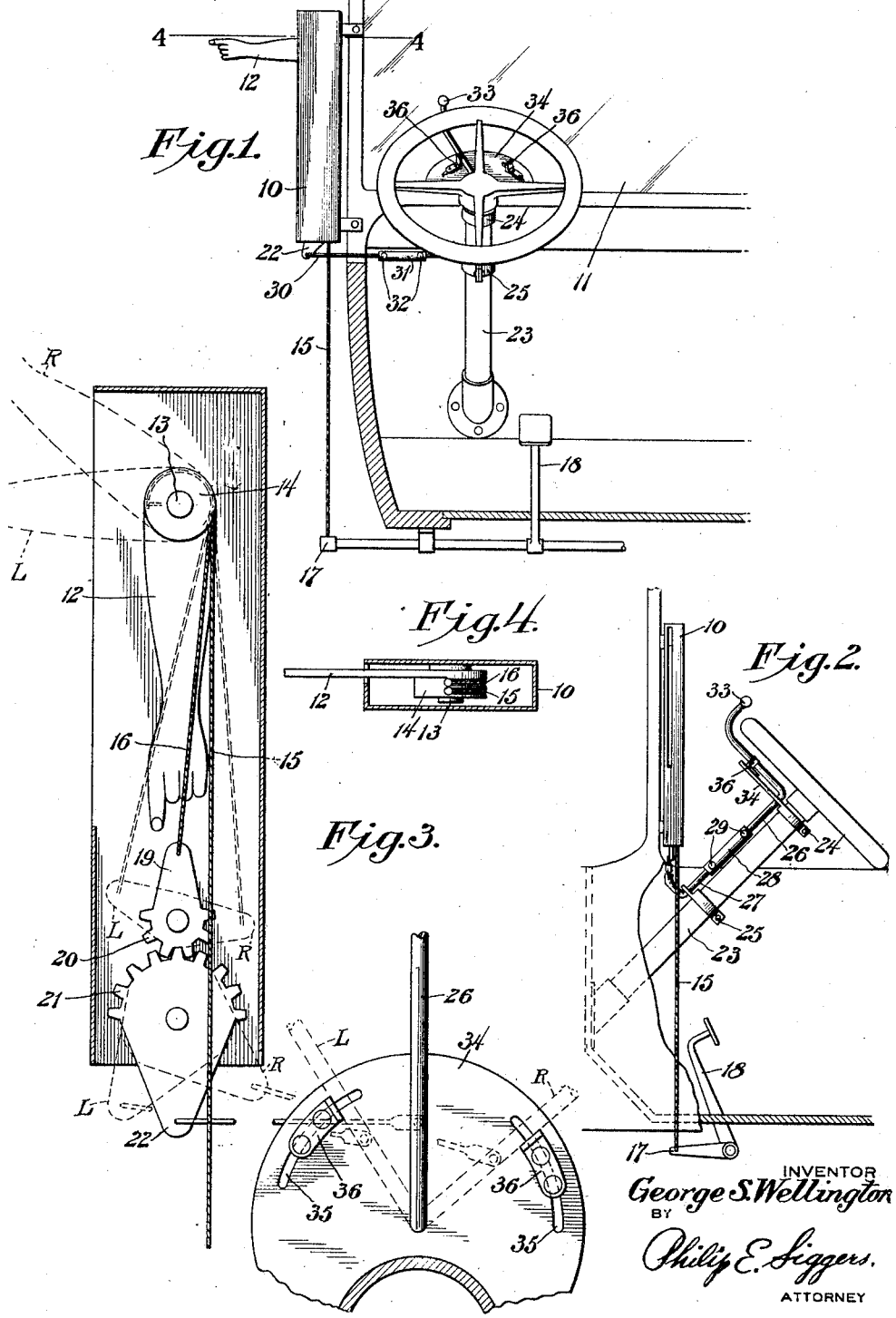
INVENTOR
George S. Wellington
BY
Philip E. Siggers,
ATTORNEY Patented Apr. 10, 1928.

1,665,648

UNITED STATES PATENT OFFICE.

GEORGE S. WELLINGTON, OF LOS ANGELES, CALIFORNIA, ASSIGNOR OF ONE-HALF TO LOUIS P. BARENCHI, OF LOS ANGELES, CALIFORNIA.

AUTOMOBILE SIGNAL.

Application filed June 23, 1927. Serial No. 200,887.

This invention relates to automobile signals and aims among other objects to provide improved means operable by a foot pedal to display a signal to indicate caution or stop and means to further move the signal to indicate a change of direction.

In the drawings:

Fig. 1 is an elevation of the signal in connection with a portion of an automobile;
Fig. 2 is a side elevation of the same;

Fig. 3 is an enlarged view of the signal and operating means, the casing being shown in section; and Fig. 4 is a horizontal section taken on the line 4—4 of Fig. 1.

When stopping or making a right or left hand turn in an automobile, it is customary to indicate by some means the intention of the driver. The driver generally uses his left arm but this necessitates the removal of the hand from the steering wheel. As the driver usually applies the brake before making a turn, the signal in the present invention is designed to be actuated by the brake pedal to indicate that the driver is about to stop or turn. Then the driver may move a hand lever attached to the steering post, to the right or left, which in turn moves the signal arm to indicate right or left turn. As soon as pressure is removed from the hand lever and brake, the signal arm returns to normal position.

Referring to the drawing, there is shown a signal support in the form of a casing 10, having an open lower end, and which is mounted on an automobile adjacent to the windshield 11. A signal arm 12 is pivotally mounted within the casing near the top, as at 13, and in the present instance is adapted to normally hang downward by gravity. Secured to the arm and concentric with the pivot 13 is a drum 14 in the periphery of which are grooves adapted to receive two flexible cables 15 and 16. Each of the cables is connected at one end to one side of the drum and then passes over drum to the other side and is so arranged that when either of the cables is pulled, the arm will swing out of the casing through a suitable slot. The other end of the cable 15 is connected to an arm 17 secured to the brake pedal shaft and which is adapted to be moved downwardly when the brake pedal 18 is depressed. The other end of the cable 16 is connected to a pivoted upper crank arm 19 having a gear segment 20 which meshes with a gear segment 21 on a similar pivoted lower crank arm 22.

Secured to the steering post 23 is an upper bracket 24 and a lower bracket 25. Mounted in the bracket 24 is an upper crank shaft 26, and in the bracket 25 a lower crank shaft 27, which shafts are adjustably connected together at their adjacent ends by a sleeve 28 and suitable set screws 29.

The lower crank 27 is connected to the arm 22 by a rod 30, preferably made of two pieces adjustably connected together by a sleeve 31 and set screws 32. The upper crank 26 is formed with a handle portion 33 located in close proximity to the upper part of the steering wheel so that the driver may operate it by sliding his hand around the upper rim of the wheel without removing his hand from the wheel.

The upper bracket is formed with an extension 34 having arcuate slots 35 in which are mounted stop brackets 36. The stops may be adjusted to limit the movement of the upper crank in either direction and thereby regulate the desired height to which the signal arm is to be raised. As shown in full lines in Fig. 3, the signal is at normal position and when the handle is moved to the right, the several parts will assume the dotted positions indicated by R, likewise when the handle is moved to the left, they will be in the dotted positions indicated by L.

When the driver depresses the foot brake, the cable 15 will be drawn downwardly and the arm 12 will swing outwardly to indicate "caution", and the cable 16 will slacken. Then if the driver desires to turn to the left, the handle 33 is moved to the left until the left hand stop is reached and the arm will be raised from "caution" to the position indicated in Fig. 1 and to L in Fig. 3. If he desires to turn to the right, the handle 33 is moved to the right until the right hand stop is reached, which stop is located further from the normal position of the handle than the left hand stop, and the arm 12 will be raised to the position shown in dotted lines at R in Fig. 3.

The cables 15 and 16 may be actuated independently of each other due to their flexibility and the adjustable features permit the device to be used on any car.

From the foregoing it will be apparent that an improved signal has been provided which is easy to install and operate and which may be manufactured at a low cost.

Obviously the present invention is not restricted to the particular embodiment thereof herein shown and described. Moreover, it is not indispensable that all the features of the invention be used conjointly, since they may be employed advantageously in various combinations and subcombinations.

What is claimed is:

1. A signal for use with automobiles comprising a casing, having a slot in one side; a normally pendant signal arm pivoted within the casing; pivoted crank arms having intermeshing gear segments also mounted within the casing; a flexible cable connecting the signal arm to one of the crank arms; a second flexible cable connecting the signal arm to the brake pedal to move the signal arm through the slot in the casing when the brake is depressed; and means for manually swinging the other crank arm to move the signal arm.

2. A signal for use with automobiles comprising a support; a normally pendant signal arm pivoted to the support; upper and lower crank arms having intermeshing gear segments also mounted on the support; a flexible cable connecting the signal arm to the upper crank arm; a second flexible cable connecting the signal arm to the brake pedal shaft to move the signal arm when the brake pedal is depressed; an adjustable crank shaft mounted on the steering post; and an adjustable rod connecting the crank shaft to the lower crank arm to move the signal arm when the crank shaft is actuated.

3. In combination with an automobile, a signal; casing secured to the automobile; a normally pendant signal arm pivoted within the casing; means connected with the signal arm and the brake pedal shaft to swing the signal arm out of the casing when the brake pedal is actuated; a hand lever mounted on the steering post; and means connecting the hand lever to the signal arm to swing the signal arm out of the casing.

4. In combination with an automobile; a signal support secured to the automobile; a normally pendant signal arm pivoted to the support; means connected with the signal arm and the brake pedal shaft to move the signal on its pivot when the brake pedal is actuated; brackets mounted on the steering post; a crank shaft mounted in said brackets; means connected between the crank shaft and the signal arm to move the arm into signaling position when said crank shaft is actuated; and stops adjustably secured to one of said brackets to limit the movement of the crank shaft.

5. In combination with an automobile; a signal support secured to the automobile; a normally pendant signal arm pivoted to the support; a drum secured to the signal arm; a crank arm secured on the brake pedal shaft; a cable connected at one end to the drum and at the other end to said crank arm to move the signal arm on its pivot when the brake pedal is actuated; upper and lower crank arms having intermeshing gear segments and pivoted to the support; a second cable connected at one end to the drum and at the other end to said upper crank arm; and means for manually rocking the lower crank arm to move the arm into signaling position.

6. In combination with an automobile, a signal casing having a vertical opening at one side and secured to the automobile; a signal arm pivoted within the casing; a drum secured to the signal arm; a crank arm secured on the brake pedal shaft; a cable connected at one end to the drum and at the other end to said crank arm to swing the signal arm out of the casing when the brake pedal is actuated; upper and lower crank arms having intermeshing gear segments also pivoted within the casing; a second cable connected at one end to the drum and at the other end to said upper crank arm; brackets secured to the steering post; a crank shaft mounted in said brackets; a rod adjustably connected between the crank shaft and the lower crank arm whereby the signal arm is swung out of the casing when said crank shaft is actuated.

7. In combination with an automobile, a support secured to the automobile; a normally pendant signal arm pivoted to the support; a drum secured to the signal arm; a crank arm secured on the brake pedal shaft; a cable connected at one end to the drum and at the other end to said crank arm to raise the signal arm when the brake pedal is actuated; upper and lower crank arms having intermeshing gear segments also pivoted to the support; a second cable connected at one end to the drum and at the other end to said upper crank arm; brackets secured to the steering post; a crank shaft mounted in said brackets; a rod adjustably connected between the crank shaft and the lower crank arm; a hand lever on the crank shaft to rock the same to raise the signal arm; and stops adjustably secured on one of the brackets to limit the movement of said hand lever.

8. A signal for use with an automobile comprising in combination; a casing having a vertical opening in one side and adapted to be secured to the automobile; a normally pendant signal arm pivoted within the casing; brackets secured to the steering post; a crank shaft mounted in said brackets; means associated with said crank shaft and said signal arm to raise the arm to signaling position when said crank shaft is actuated; and stops adjustably secured to one of said brackets to limit the movement of said crank shaft.

In testimony, that I claim the foregoing as my own, I have hereto affixed my signature.

GEORGE S. WELLINGTON.